United States Patent [19]

Clarke, Jr.

[11] 4,218,843
[45] Aug. 26, 1980

[54] CONTAINER FOR RELEASING DRY CHEMICAL IN A BODY OF WATER

[75] Inventor: John L. Clarke, Jr., Riverside, Ill.

[73] Assignee: Clarke Outdoor Spraying Company, Inc., Roselle, Ill.

[21] Appl. No.: 959,582

[22] Filed: Nov. 13, 1978

[51] Int. Cl.$^3$ .............................................. A01M 1/20
[52] U.S. Cl. .................................... 43/131; 43/44.99; 206/0.5
[58] Field of Search ..................... 43/44.99, 42.06, 131; 206/0.5, 216

[56] References Cited
U.S. PATENT DOCUMENTS

| | | | |
|---|---|---|---|
| 1,831,476 | 11/1931 | Bennett | 206/0.5 |
| 2,934,409 | 4/1960 | Biehl | 206/0.5 |
| 2,997,160 | 8/1961 | Marshall, Jr. | 43/44.99 |

FOREIGN PATENT DOCUMENTS 1266093  5/1961  France .................................. 43/44.99

Primary Examiner—Nicholas P. Godici
Assistant Examiner—Roscoe V. Parker
Attorney, Agent, or Firm—Kinzer, Plyer, Dorn & McEachran

[57] ABSTRACT

A device for releasing mosquito larvae-killing material into a body of water includes a porous container having mosquito larvae-killing material therein. There are buoyancy means associated with the container to raise it above the bottom surface of a body of water and out of any silt that may be at the bottom. There is a weight adjacent one end of the container which cooperates with the buoyancy means to maintain the container in a generally upright position within the body of water. There is a flexible connection between that portion of the container holding the larvae-killing material and the weight to permit the container to move as water flows by it and to prevent the container from being buried in surrounding silt.

1 Claim, 2 Drawing Figures

CONTAINER FOR RELEASING DRY CHEMICAL IN A BODY OF WATER

SUMMARY OF THE INVENTION

The present invention relates to devices for releasing mosquito larvae-killing material in a body of water and in particular to such a device which may be deposited in a mosquito breeding area whether or not water is currently present in that area.

A primary purpose of the invention is a device of the type described which will remain dormant until such time as water activates the larvae-killing material, but which includes structural features which will present the container from being buried within silt or the like.

Another purpose is a simply constructed and reliable device for releasing, when activated by water, mosquito larvae-killing material.

Another purpose is a device of the type described including a porous pocket containing mosquito larvae-killing material and spaced from a connected weight, with the connection between the weight and the pocket being flexible and forming a hinge to permit the pocket to move relative to the weight to insure that it is not buried in silt and does not form an obstruction to water flow.

Another purpose is a device of the type described which has utility in releasing various types of dry chemicals in the body of water.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

It has been the practice in mosquito control programs to place pellets, granules or mosquito larvae-killing chemical in other forms in catch basins or other bodies of water where the larvae conventionally grow. However, if there is not water in a catch basin at the time the pellets or the like are planted, it often happens that the pellets become buried in silt and when water ultimately flows into the catch basin, the chemical is essentially de-activated because it is buried. Small granules or pellets which may be dropped into a catch basin with water, may well be carried by a current flowing through the basin away from the immediate area, thus losing their effectiveness. The prevent invention provides a means for releasing mosquito larvae-killing material which will not be buried by silt or the like and become embedded in the bottom, will not be an obstruction to current flow, and will not itself be carried away by any current through the catch basin. The device will remain dormant until such time as water reaches the basin at which time it will rise to a generally upright position within the body of water and the mosquito larvae-killing material within a porous container will be slowly released at a level intermediate the top and bottom of the water area. Current flowing through the catch basin or the like will cause the device to assume a generally horizontal position so that it does not obstruct flow. The weight for the device is spaced from and flexibly connected to the pocket containing the larvae-killing material with the result that it is impossible for silt or the like to cover the chemical, thus it is insured that activation will result when water reaches the catch basin.

Although the invention will be described in connection with a mosquito control program, it has other uses. For example, the basic structure disclosed herein may be used to control snail parasites, black fly larvae, algae and submerged aquatic weeds and swimmer's itch. When the device is used in a mosquito program the chemical may be Dursban 10 CR, a product of Dow Chemical Corporation, which is essentially an organophospate insecticide incorporated into a plastic which provides a controlled release up to the limit of its solubility in water. The release time period may be as much as six months.

Figure 2:
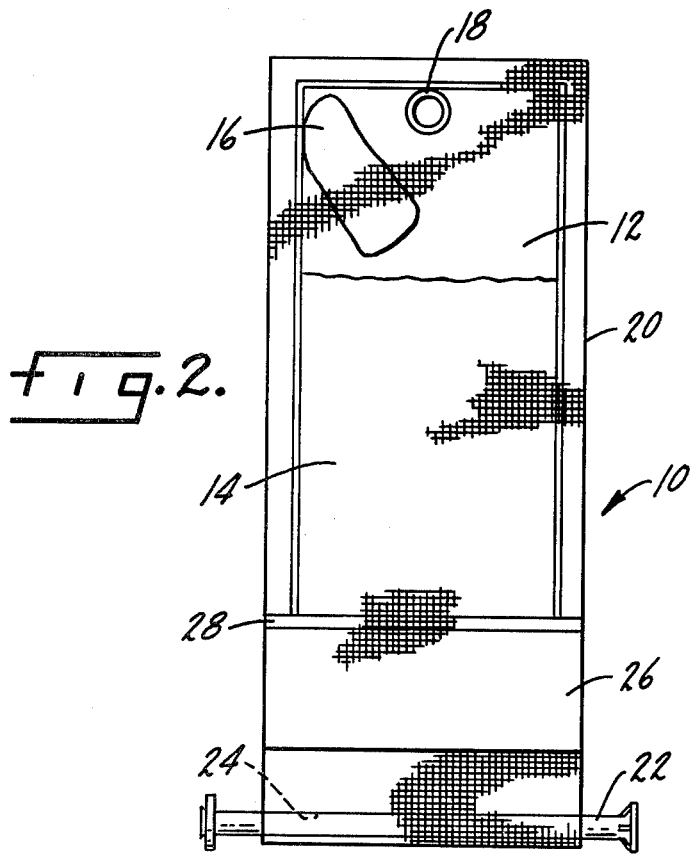
FIG. 2 is a side view of the device.

Looking first at FIG. 2, a sack indicated generally at 10, which may be formed of a porous material such as screen mesh or a cloth, defines a pocket 12 having mosquito larvae-killing chemical in the form of granules 14 positioned therein. A bouyant member, for example a small piece of styrofoam or the like, is indicated at 16 and may be positioned at the top of pocket 12. A small steel grommet or the like 18 may be positioned adjacent the top of sack 10 and is used in those applications in which it is desired to tie the device within a catch basin or the like to insure its remaining in position. Assuming that the sack 10 is formed from a cloth with a rather wide weave, the edges 20 of pocket 12 may be formed either by sewing, adhesive or a heat seal.

A weight or the like 22, which may for example be a nail, headed at each end, is positioned within a lower pocket 24 spaced from pocket 12. That area of the sack 10 between pockets 24 and 12, indicated at 26, may be closed either by adhesive or by sewing and is effective to space the weight from pocket 12. At the upper end of area 26, and at the bottom of pocket 12, there may be a hinge 28 which is essentially formed by the adhesive seal closing the bottom of pocket 12. In the alternative, the hinge may be formed merely by the flexible nature of area 26. What is important is to have a flexible and/or hinge-like connection between pocket 12 and weight 22.

Figure 1:
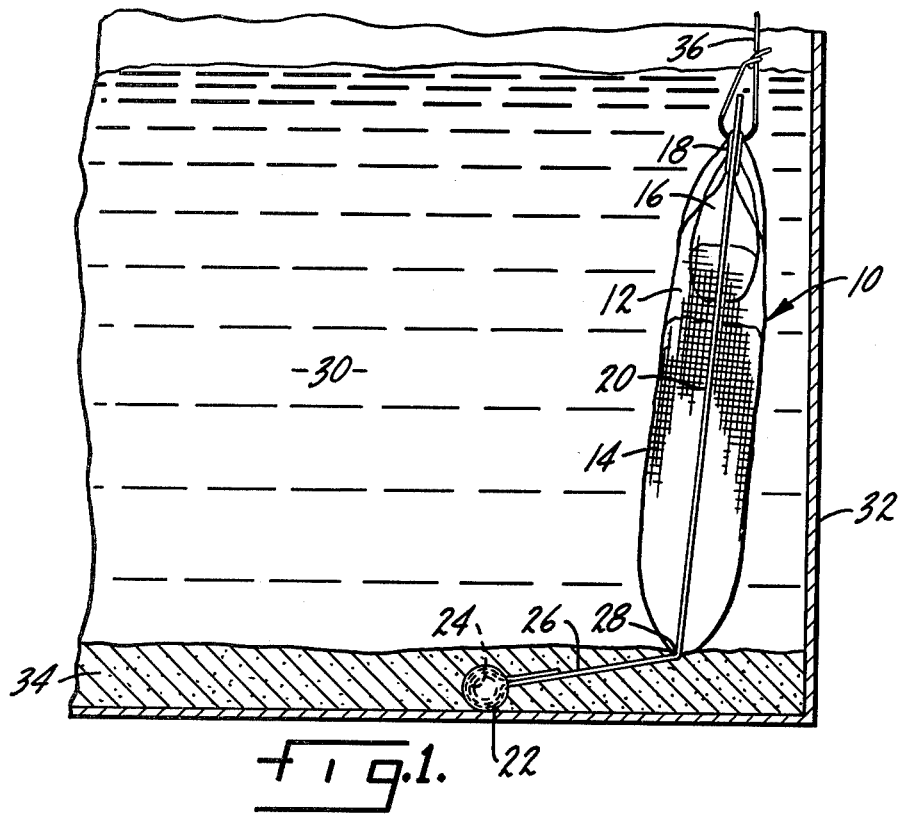
FIG. 1 is a diagrammatic illustration of the device disclosed herein as positioned within a body of water.

Looking at FIG. 1, a body of water is indicated at 30 and may be defined by a container 32 which may represent a catch basin or similar structure. The invention has application in catch basins and in other bodies of water which generally are breeding grounds for mosquitoes. Silt or the like is indicated at 34 and, as is common in catch basins, will form a layer at the bottom. As indicated above, one of the problems with prior devices for killing mosquito larvae is that the pellets or granules have a tendency to become embedded in the silt which prevented their activation by the water within the basin. This is particularly true if the granules were deposited when the basin was dry.

As clearly indicated in FIG. 1, weight 22 will rest upon the bottom of container 32, whereas, the sack 10 will bend at hinge 28 so that the pocket 12 containing granules 14 may assume a generally upright position in the body of water 30. The buoyant member 16 will cause te sack to rise to the position shown, regardless of whether the sack had been initially at least partially buried by silt prior to the time water flowed into the area. The position of FIG. 1 is that for the device when water is in the area and when the mosquito larvae-killing material is performing its function. A line or the like 36 has been passed through grommet 18 so as to maintain the device in the position shown. That is, to prevent its being carried away by the rapid flow of water through the basin. In this connection, the hinge of flexible connection between the weight and pocket 12 not only insures that the granules 14 will not be covered by silt, but also performs a second function. In the event that there is current through the catch basin, the device could become an obstruction to such flow, particularly in the event it was positioned at the mouth or opening of a connecting pipe. The hinge permits the device to be bent over to a generally horizontal or approximately horizontal position by the current so that the device is not in any way an obstruction to current flow through the basin.

The type of mosquito-killing material is not important. It may be granules, pellets or the like, or any other type of material which is customarily used for such function and which is activated by water. The sack may be screen, cloth with a wide weave or a generally rigid container which is porous. What is important is that there be a flexible connection between the pocket for the mosquito larvae-killing material and the weight to permit the above-described movements.

Whereas the preferred form of the invention has been shown and described herein, it should be realized that there may be many modifications, substitutions and alterations thereto.

The embodiments of the invention in which an exclusive property or privilege is claimed are as follows:

1. A device for releasing mosquito larvae-killing material into a body of water including a sack formed of a porous material, said sack being closed at one end and at an intermediate location to define a pocket for said material, a buoyant member positioned adjacent said closed sack end, a second pocket spaced from said first named pocket and adjacent the opposite end of said sack, a weight in said second pocket, the closure of said sack at said intermediate location forming a flexible hinge-like connection between said first and second pockets whereby the pocket for said material may bend relative to the second pocket containing said weight permitting movement of said first pocket with the current in a body of water and permitting said buoyant member to raise said first pocket above the bottom of said body of water.

* * * * *